(12) United States Patent
Ahn et al.

(10) Patent No.: US 10,643,490 B2
(45) Date of Patent: May 5, 2020

(54) METHOD, SYSTEM, AND NON-TRANSITORY COMPUTER-READABLE RECORDING MEDIUM FOR PROVIDING LEARNING INFORMATION

(71) Applicant: CLASSCUBE CO., LTD., Geumcheon-gu, Seoul (KR)

(72) Inventors: Seong Chan Ahn, Seoul (KR); Young Don Kim, Gwangmyeong-si (KR)

(73) Assignee: CLASSCUBE CO., LTD., Seoul (KR)

( * ) Notice: Subject to any disclaimer, the term of this patent is extended or adjusted under 35 U.S.C. 154(b) by 289 days.

(21) Appl. No.: 15/563,386

(22) PCT Filed: Jan. 8, 2016

(86) PCT No.: PCT/KR2016/000196
§ 371 (c)(1),
(2) Date: Nov. 27, 2017

(87) PCT Pub. No.: WO2016/159497
PCT Pub. Date: Oct. 6, 2016

(65) Prior Publication Data
US 2018/0090026 A1 Mar. 29, 2018

(30) Foreign Application Priority Data
Mar. 30, 2015 (KR) ........................ 10-2015-0043868

(51) Int. Cl.
*G09B 7/08* (2006.01)
*G09B 5/02* (2006.01)
(Continued)

(52) U.S. Cl.
CPC ................. *G09B 7/08* (2013.01); *G09B 5/02* (2013.01); *G09B 5/12* (2013.01); *G09B 7/077* (2013.01); *G09B 19/025* (2013.01)

(58) Field of Classification Search
CPC ............... G09B 5/08; G09B 5/12; G09B 5/14
See application file for complete search history.

(56) References Cited

U.S. PATENT DOCUMENTS

2014/0255898 A1\* 9/2014 Burge ...................... G09B 5/08
434/350
2014/0335497 A1\* 11/2014 Gal .......................... G09B 7/00
434/323
(Continued)

FOREIGN PATENT DOCUMENTS

KR 10-2001-0107858 A 12/2001
KR 10-2010-000017 A 1/2010
(Continued)

OTHER PUBLICATIONS

International Searching Authority, International Search Report issued in PCT/KR2016/000196 dated Apr. 20, 2016, 2 pages.

*Primary Examiner* — James S. McClellan
(74) *Attorney, Agent, or Firm* — Dinsmore & Shohl LLP; Yongsok Choi, Esq.

(57) ABSTRACT

The present invention relates to a method, system, and non-transitory computer-readable recording medium for providing learning information. According to the invention, it is possible to consider, in providing supplementary learning information to a learner, both of a supplementary learning pattern common to all learners and a supplementary learning pattern of a specific learner whose characteristics are similar to those of the learner, so that learning units necessary for supplementary learning of the learner may be found accurately and efficiently.

16 Claims, 10 Drawing Sheets

(51) Int. Cl.
*G09B 5/12* (2006.01)
*G09B 7/077* (2006.01)
*G09B 19/02* (2006.01)

(56) References Cited

U.S. PATENT DOCUMENTS

2015/0026184 A1* 1/2015 Ossikine ................ G06F 16/35
  707/738
2016/0328984 A1* 11/2016 Ben-Naim ............... G09B 5/12

FOREIGN PATENT DOCUMENTS

| KR | 10-2012-0136948 A | 12/2012 |
| KR | 10-2014-0145018 A | 12/2014 |

* cited by examiner

METHOD, SYSTEM, AND NON-TRANSITORY COMPUTER-READABLE RECORDING MEDIUM FOR PROVIDING LEARNING INFORMATION

CROSS-REFERENCE TO RELATED APPLICATIONS

This application is a national stage entry of Patent Cooperation Treaty (PCT) international application Serial No. PCT/KR2016/000196, filed on Jan. 8, 2016, which claims priority to Korean Patent Application Serial No. 10-2015-0043868, filed on Mar. 30, 2015. The entire contents of PCT international application Serial No. PCT/KR2016/000196, and Korean Patent Application Serial No. 10-2015-0043868 are hereby incorporated by reference.

FIELD OF THE INVENTION

The present invention relates to a method, system, and non-transitory computer-readable recording medium for providing learning information.

BACKGROUND

With the development of information and communication technology, various learning methods are emerging which allow a learner to make progress in learning according to his/her own conditions, contrary to traditional learning methods in which a learner actually meets a teacher to perform learning through the guidance of the teacher.

Particularly, active learning methods, which allow a learner to initiatively perform learning at a desired time and place using a communication network, are lively performed in various educational fields.

In conventional techniques introduced so far, it is general that learning information is provided sequentially (in reverse order when a review is required) according to a predetermined learning system such as a standard curriculum. For example, when a learner fails to gain a satisfactory academic achievement for a unit called "Addition of Fractions" in the fourth grade course of elementary school, learning information on a unit, "Least Common Multiple," which falls in a basic course of the unit, "Addition of Fractions" according to a predetermined learning system, is provided to the learner as supplementary learning information.

However, according to the above conventional techniques, learning information is provided only in a fixed order or pattern according to a predetermined learning system. Therefore, there is a limitation that uniform learning information is provided to all learners without considering actual weaknesses of the learners or characteristics of each learner, and there occurs a problem that efficient learning cannot be performed as a learner is provided with all learning information that is unnecessary for the learner.

SUMMARY OF THE INVENTION

One object of the present invention is to solve all the above-described problems in prior art.

Another object of the invention is to consider, in providing supplementary learning information to a learner, both of a supplementary learning pattern common to all learners and a supplementary learning pattern of a specific learner whose characteristics are similar to those of the learner, by determining a direction of supplementary learning necessary for a learner, based on the learner's academic achievement for a target learning unit; determining at least one supplementary learning unit to be provided to the learner, with reference to a first weight determined based on a correlation between the target learning unit and each of at least one other learning unit connected to the target learning unit along the determined direction, and a second weight determined based on a supplementary learning pattern experienced by another learner, wherein learning characteristics of the another learner and those of the learner are similar at or above a predefined level; and providing the learner with learning information on the at least one determined supplementary learning unit, wherein the first weight is acquired from a knowledge map including two or more nodes each corresponding to two or more learning units and at least one link which connects the two or more nodes and is assigned a correlation between the two or more learning units.

The representative configurations of the invention to achieve the above objects are described below.

According to one aspect of the invention, there is provided a method for providing learning information, comprising the steps of: determining a direction of supplementary learning necessary for a learner, based on the learner's academic achievement for a target learning unit; determining at least one supplementary learning unit to be provided to the learner, with reference to a first weight determined based on a correlation between the target learning unit and each of at least one other learning unit connected to the target learning unit along the determined direction, and a second weight determined based on a supplementary learning pattern experienced by another learner, wherein learning characteristics of the another learner and those of the learner are similar at or above a predefined level; and providing the learner with learning information on the at least one determined supplementary learning unit, wherein the first weight is acquired from a knowledge map including two or more nodes each corresponding to two or more learning units and at least one link which connects the two or more nodes and is assigned a correlation between the two or more learning units.

According to another aspect of the invention, there is provided a system for providing learning information, comprising: a knowledge map management unit configured to manage a knowledge map including two or more nodes each corresponding to two or more learning units and at least one link which connects the two or more nodes and is assigned a correlation between the two or more learning units; a learner management unit configured to manage information on a supplementary learning pattern experienced by at least one learner; and a supplementary learning management unit configured to determine a direction of supplementary learning necessary for a learner, based on the learner's academic achievement for a target learning unit, to determine at least one supplementary learning unit to be provided to the learner, with reference to a first weight determined based on a correlation between the target learning unit and each of at least one other learning unit connected to the target learning unit along the determined direction, and a second weight determined based on a supplementary learning pattern experienced by another learner, wherein learning characteristics of the another learner and those of the learner are similar at or above a predefined level, and to provide the learner with learning information on the at least one determined supplementary learning unit, wherein the first weight is acquired from the knowledge map management unit and the second weight is acquired from the learner management unit.

In addition, there are further provided other methods and systems to implement the invention, as well as non-transitory computer-readable recording media having stored thereon computer programs for executing the methods.

According to the invention, it is possible to consider, in providing supplementary learning information to a learner, both of a supplementary learning pattern common to all learners and a supplementary learning pattern of a specific learner whose characteristics are similar to those of the learner, so that learning units necessary for supplementary learning of the learner may be found accurately and efficiently.

According to the invention, it is possible to accurately provide a learner with only learning information on learning units necessary for the learner, so that the efficiency of supplementary learning may be improved.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Figure 3:
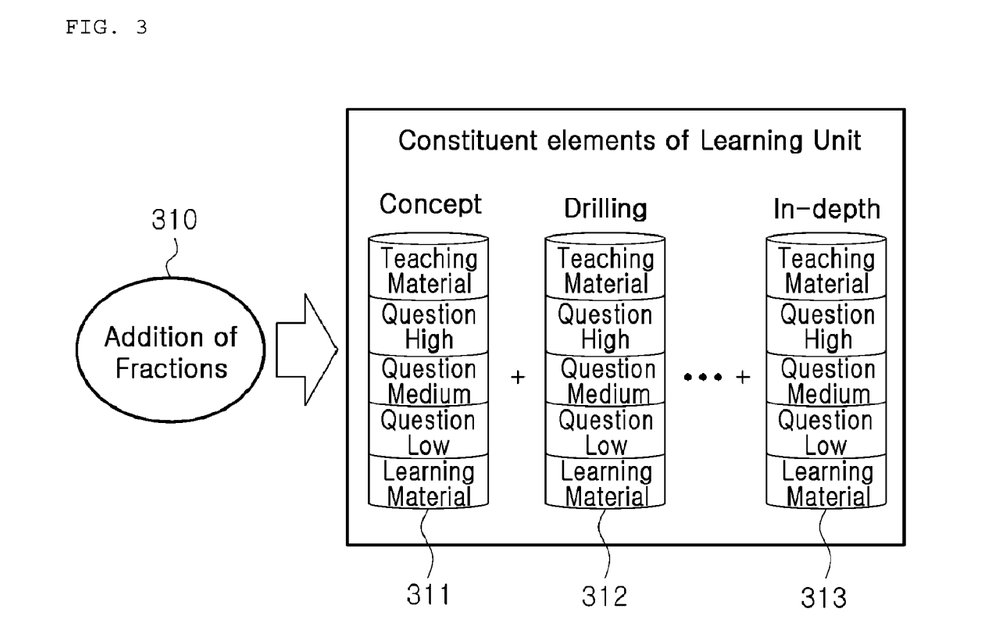
FIG. 3 illustratively shows the configuration of a learning unit according to one embodiment of the invention.

In the present invention, a learning unit refers to a unit in which learning information is provided to a learner, and may be defined based on a subject, a grade, and a curriculum unit, for example. According to one embodiment of the invention, the learning information included in the learning unit may be classified according to stages such as concept learning, drilling and in-depth learning, and the learning information corresponding to each stage may include textbooks, questions by difficulties, learning materials, and the like. FIG. 3 illustratively shows the configuration of a learning unit according to one embodiment of the invention. However, it is noted that the configuration of the learning unit according to the invention is not necessarily limited to those mentioned above or illustrated in FIG. 3, and may be changed without limitation as long as the objects of the invention may be achieved.

Configuration of an Entire System

Figure 1:
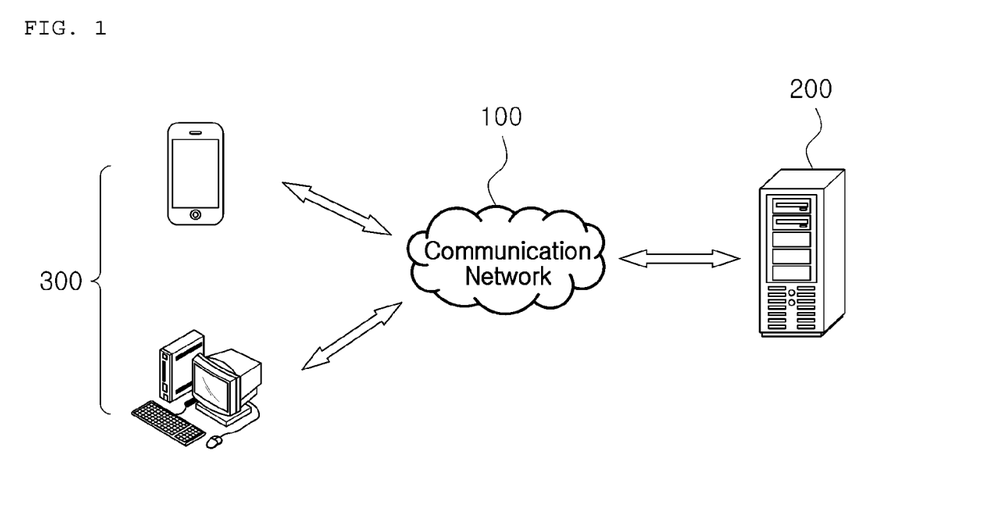
FIG. 1 schematically shows the configuration of an entire system for providing learning information according to one embodiment of the invention.

FIG. 1 schematically shows the configuration of an entire system for providing learning information according to one embodiment of the invention.

As shown in FIG. 1, the entire system according to one embodiment of the invention may comprise a communication network 100, a learning information provision system 200, and a user terminal device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television networks.

Next, the learning information provision system 200 according to one embodiment of the invention may function to consider, in providing supplementary learning information to a learner, both of a supplementary learning pattern common to all learners and a supplementary learning pattern of a specific learner whose characteristics are similar to those of the learner, by determining a direction of supplementary learning necessary for a learner, based on the learner's academic achievement for a target learning unit; determining at least one supplementary learning unit to be provided to the learner, with reference to a first weight determined based on a correlation between the target learning unit and each of at least one other learning unit connected to the target learning unit along the determined direction, and a second weight determined based on a supplementary learning pattern experienced by another learner, wherein learning characteristics of the another learner and those of the learner are similar at or above a predefined level; and providing the learner with learning information on the at least one determined supplementary learning unit, wherein the first weight is acquired from a knowledge map including two or more nodes each corresponding to two or more learning units and at least one link which connects the two or more nodes and is assigned a correlation between the two or more learning units.

The configuration and function of the learning information provision system 200 according to the invention will be discussed in detail in the following description.

Next, the user terminal device 300 according to one embodiment of the invention is digital equipment capable of allowing a user to connect to and then communicate with the learning information provision system 200, and any type of digital equipment having a microprocessor and a memory means for computing capabilities, such as smart phones, tablets, smart watches, smart bands, smart glasses, desktop computers, notebook computers, workstations, personal digital assistants (PDAs), web pads, and mobile phones, may be adopted as the user terminal device 300 according to the invention.

Particularly, the user terminal device 300 may include an application (not shown) to assist a user to receive services such as supplementary learning from the learning information provision system 200. The application may be downloaded from the learning information provision system 200 or a known web server (not shown).

Configuration of the Service Provision System

Hereinafter, the internal configuration of the learning information provision system crucial for implementing the invention and the functions of the respective components thereof will be discussed.

Figure 2:
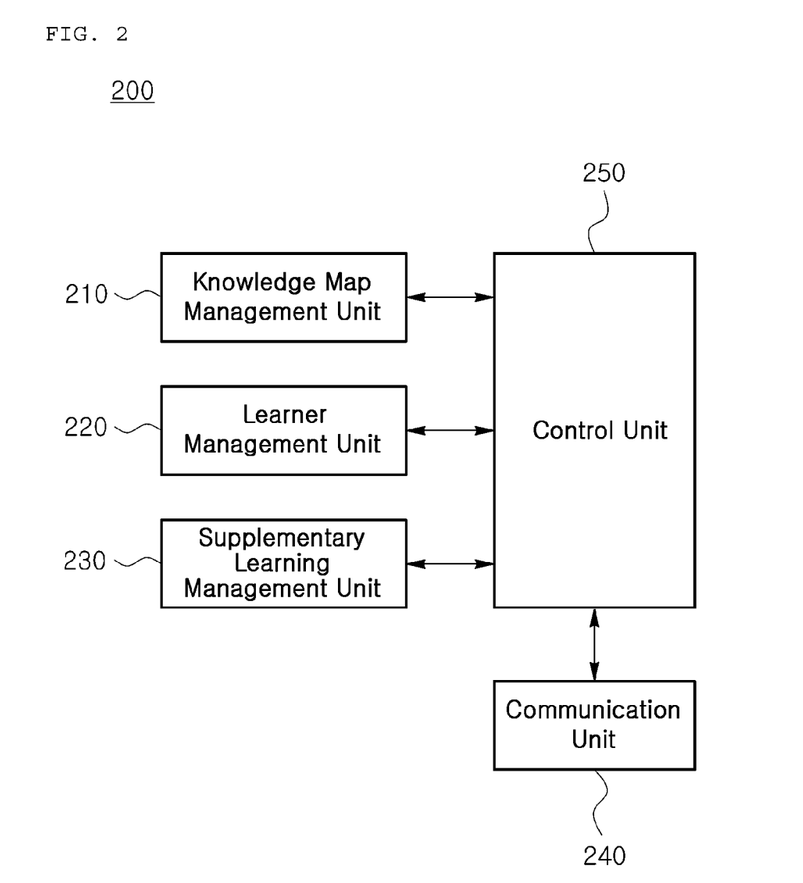
FIG. 2 illustratively shows the internal configuration of a learning information provision system according to one embodiment of the invention.

FIG. 2 illustratively shows the internal configuration of the learning information provision system according to one embodiment of the invention.

Referring to FIG. 2, the learning information provision system 200 according to one embodiment of the invention may comprise a knowledge map management unit 210, a learner management unit 220, a supplementary learning management unit 230, a communication unit 240, and a control unit 250. According to one embodiment of the invention, at least some of the knowledge map management unit 210, the learner management unit 220, the supplementary learning management unit 230, the communication unit 240, and the control unit 250 may be program modules to communicate with an external system (not shown). The program modules may be included in the learning information provision system 200 in the form of operating systems, application program modules, and other program modules, while they may be physically stored in a variety of commonly known storage devices. Further, the program modules may also be stored in a remote storage device that may communicate with the learning information provision system 200. Meanwhile, such program modules may include, but not limited to, routines, subroutines, programs, objects, components, data structures, and the like for performing specific tasks or executing specific abstract data types as will be described below in accordance with the invention.

First, according to one embodiment of the invention, the knowledge map management unit 210 may function to define a knowledge map including two or more nodes each corresponding to two or more learning units and at least one link which connects the two or more nodes and is assigned a correlation between the two or more learning units.

Specifically, according to one embodiment of the invention, an initial state of the multiple nodes and the link constituting the knowledge map may be basically defined based on a learning system (e.g., a subject, a grade, a curriculum unit, etc.) predetermined for the multiple learning units.

Further, according to one embodiment of the invention, the link constituting the knowledge map may be assigned a weight, which is a correlation between two learning units each corresponding to two nodes connected by the link, as described above.

Specifically, according to one embodiment of the invention, the correlation assigned to the link in the knowledge map may be dynamically determined based on nodes and links that at least one learner has traversed on the knowledge map while performing supplementary learning for the two or more learning units. For example, a greater correlation may be assigned to a link that the at least one learner has traversed more frequently while performing supplementary learning.

Further, according to one embodiment of the invention, the correlation assigned to the link in the knowledge map may be dynamically determined based on academic achievements of at least one learner for learning units corresponding to nodes that the at least one learner has traversed on the knowledge map while performing supplementary learning for the two or more learning units. For example, a greater correlation may be assigned to a link connected toward a node for which the at least one learner has shown a lower academic achievement.

Meanwhile, according to one embodiment of the invention, the knowledge map management unit 210 may change the configuration of the knowledge map (i.e., the connection relationship between the nodes by the links) based on the correlations dynamically assigned to the links in the knowledge map.

Specifically, when a correlation between two learning units each corresponding to two nodes connected by a link in the knowledge map is less than a predefined level, the knowledge map management unit 210 according to one embodiment of the invention may function to remove the existing link connecting the two nodes each corresponding to the above two learning units.

Further, when two learning units each corresponding to two nodes not connected by a link share a specific learning unit having a correlation not less than a predefined level, the knowledge map management unit 210 according to one embodiment of the invention may create a new link connecting the two nodes each corresponding to the two learning units.

Figure 4:
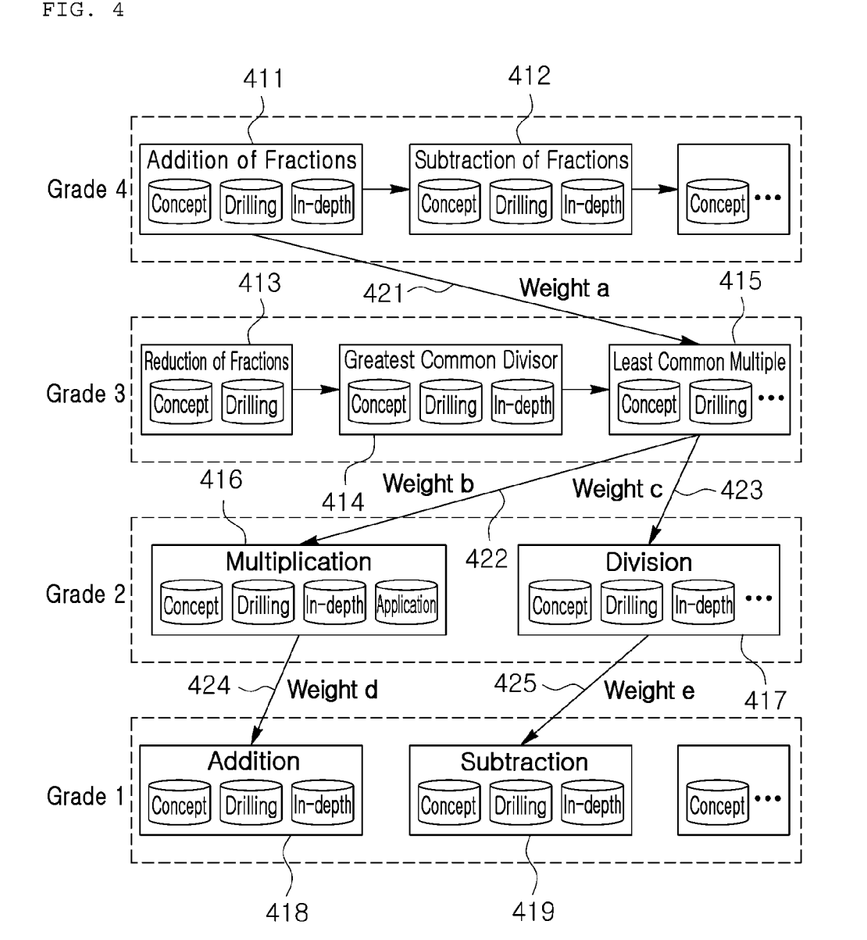
FIG. 4 illustratively shows the configuration of a knowledge map according to one embodiment of the invention.

FIG. 4 illustratively shows the configuration of a knowledge map according to one embodiment of the invention.

Referring to FIG. 4, the knowledge map may include a plurality of nodes 411 to 419 corresponding to a plurality of learning units such as addition of fractions, subtraction of fractions, reduction of fractions, greatest common divisor, least common multiple, multiplication, division, addition, and subtraction, and may include links 421 to 425 connecting any two of the plurality of nodes, wherein each of the links may be assigned a predetermined weight (i.e., weights a to e).

Next, according to one embodiment of the invention, a learner management unit 220 may function to manage (i.e., create and update) information on supplementary learning patterns including information on nodes and links that a learner has traversed while performing supplementary learning. According to one embodiment of the invention, the information on the supplementary learning patterns may include information on academic achievements that the learner has shown for learning units corresponding to nodes included in the supplementary learning patterns, and may particularly include information on a supplementary learning pattern in which the learner has gained a predefined level of academic achievement for a specific learning unit successfully (i.e., in the shortest path). As will be described later, the information on the supplementary learning patterns of the learner managed as above may be utilized as a second weight in determining a supplementary learning unit to be provided to the learner.

Next, according to one embodiment of the invention, the supplementary learning management unit 230 may function to determine a direction of supplementary learning necessary for a learner, based on the learner's academic achievement for a target learning unit.

Specifically, when the learner's academic achievement for the target learning unit is less than a predefined level, the supplementary learning management unit 230 according to one embodiment of the invention may determine a direction toward a learning unit whose level is lower than that of the target learning unit, with respect to the target learning unit, as the direction of supplementary learning. Further, when the learner's academic achievement for the target learning unit is not less than a predefined level, the supplementary learning management unit 230 according to one embodiment of the invention may determine a direction toward a learning unit whose level is not lower than that of the target learning unit, with respect to the target learning unit, as the direction of supplementary learning.

Further, according to one embodiment of the invention, the supplementary learning management unit 230 may function to determine at least one supplementary learning unit to be provided to the learner, with reference to a first weight determined based on a correlation between the target learning unit and each of at least one other learning unit connected to the target learning unit along the determined direction, and a second weight determined based on a supplementary learning pattern experienced by another learner, wherein learning characteristics of the another learner and those of the learner who will perform supplementary learning are similar at or above a predefined level.

Specifically, the supplementary learning management unit 230 according to one embodiment of the invention may determine at least a part of the at least one other learning unit connected to the target learning unit along the determined direction, as the at least one supplementary learning unit to be provided to the learner, wherein a combined value of the first and second weights of the at least a part of the at least one other learning unit is not less than a predefined level.

Further, according to one embodiment of the invention, the supplementary learning management unit 230 may function to provide the learner with learning information on the at least one supplementary learning unit determined as above.

Specifically, the supplementary learning management unit 230 according to one embodiment of the invention may determine a learning information provision ratio or a learning information provision order of the at least one supplementary learning unit, based on a combined value of the first and second weights. For example, learning information on the other learning unit whose combined value of the first and second weights is greatest, among the at least one other learning unit connected to the target learning unit along the determined direction, may be provided at the highest ratio or with the highest priority.

Further, when the learner's academic achievement for the supplementary learning unit provided as above is not less than a predefined level, the supplementary learning management unit 230 according to one embodiment of the invention may decide that the learner has sufficiently performed supplementary learning correlated with the target learning unit, and may accordingly provide again the learner with learning information on the target learning unit, which has been the basis for the supplementary learning. In this case, the learner who has performed the supplementary learning for the supplementary learning unit highly correlated with the target learning unit may be expected to show an academic achievement not less than a predefined level for the target learning unit. That is, the supplementary learning management unit 230 according to one embodiment of the invention may allow the learner to return to the target learning unit and continue learning, after completion of supplementary learning for several supplementary learning units necessary for increasing the academic achievement for the target learning unit (i.e., the supplementary learning units whose first and second weights are great).

Meanwhile, the above-mentioned second weight may be determined based on nodes and links included in a supplementary learning pattern experienced by another learner, wherein learning characteristics of the another learner and those of the learner who will perform supplementary learning are similar at or above a predefined level. Here, the learning characteristics based on which the similarity between the learners is determined may include a grade, an academic achievement, a learning range, a learning speed, and the like.

Specifically, according to one embodiment of the invention, the second weight may be determined to be greater for a learning unit corresponding to a node that is more frequently included in the supplementary learning pattern experienced by the another learner whose learning characteristics are similar to those of the learner who will perform supplementary learning at or above a predefined level, among the at least one other learning unit connected to the target learning unit along the determined direction.

Further, according to one embodiment of the invention, the second weight may be determined to be greater for a learning unit corresponding to a node having a lower academic achievement of the another learner whose learning characteristics are similar to those of the learner who will perform supplementary learning at or above a predefined level, among the at least one other learning unit connected to the target learning unit along the determined direction.

Figure 5:
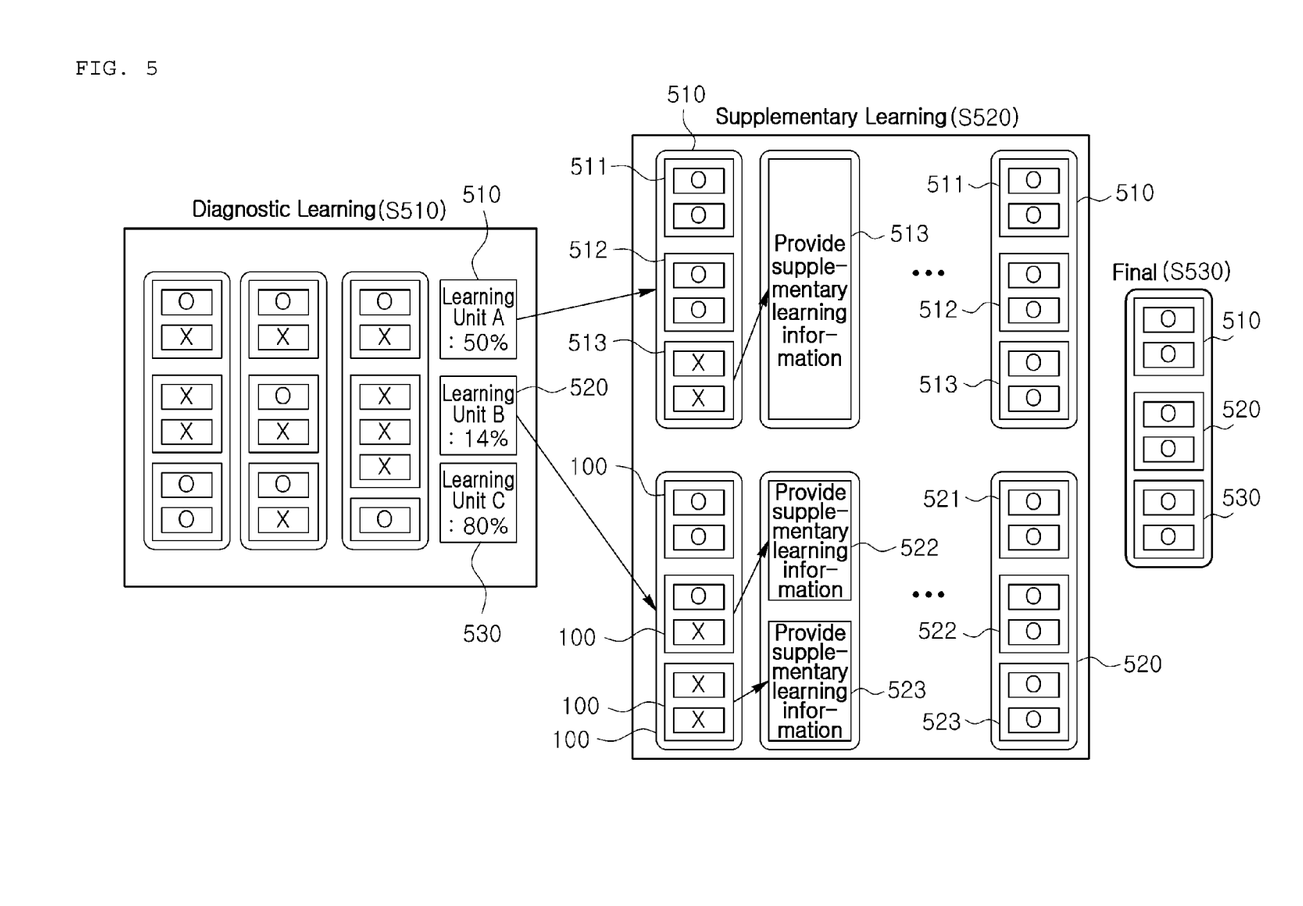
FIG. 5 illustratively shows how to progress diagnostic learning and supplementary learning according to one embodiment of the invention.

FIG. 5 illustratively shows how to progress diagnostic learning and supplementary learning according to one embodiment of the invention.

Referring to FIG. 5, in view of a result of diagnostic learning S510 performed by a learner, a learning unit A 510 and a learning unit B 520 for which the learner has respectively shown academic achievements of 50% and 14% (i.e., low academic achievements) may be determined to be subject to supplementary learning S520. Referring further to FIG. 5, among learning units 511 to 513 provided as supplementary learning units for the learning unit A 510, and learning units 521 to 523 provided as supplementary learning units for the learning unit B 520, the learning units 513, 522 and 523 with low academic achievements may be again determined to be subject to supplementary learning. As described above, the learner may perform supplementary learning for learning units with low academic achievements over several stages, thereby eventually increasing academic achievements for all learning units.

Figure 6:
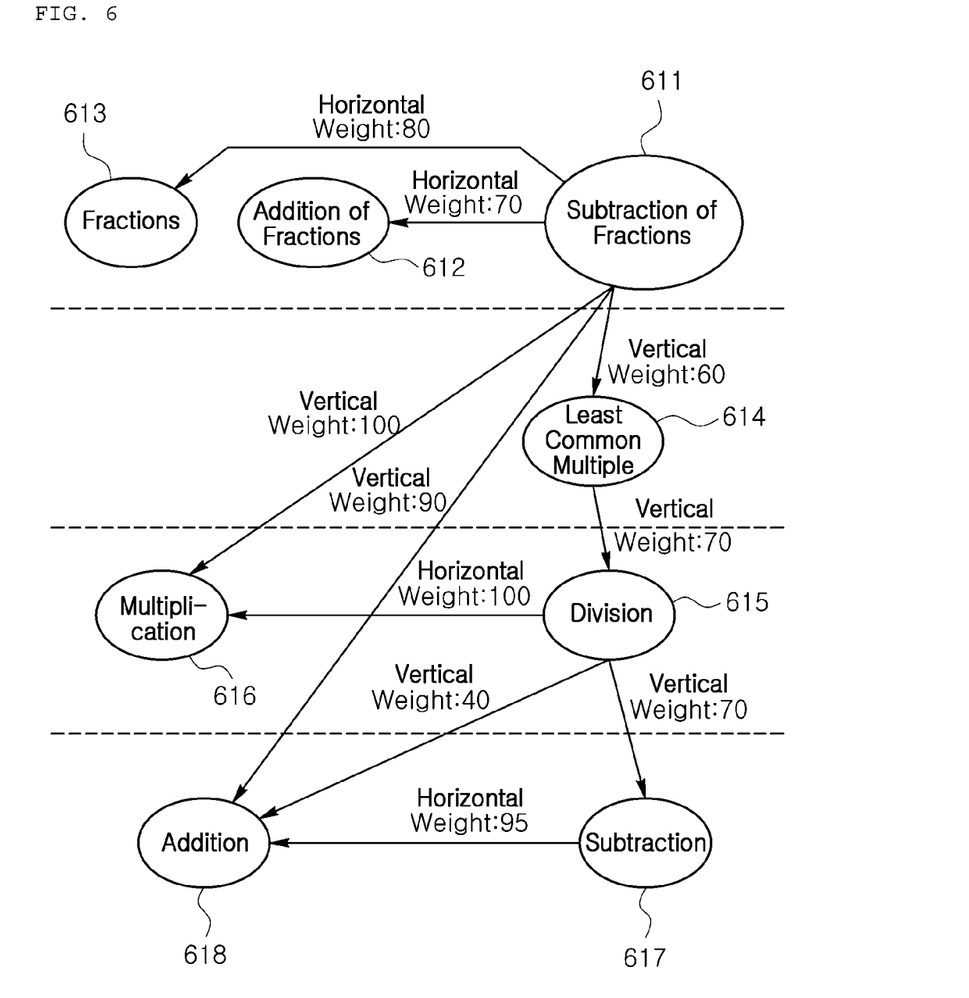
FIG. 6 illustratively shows the configuration of a knowledge map referred to for downward supplementary learning according to one embodiment of the invention.

FIG. 6 illustratively shows the configuration of a knowledge map referred to for downward supplementary learning according to one embodiment of the invention.

Referring to FIG. 6, it may be assumed that an academic achievement of a learner for a learning unit called "Subtraction of Fractions" is less than a predefined level. In this case, the supplementary learning management unit 230 according to one embodiment of the invention may determine a direction toward a learning unit whose level is lower than that of the learning unit "Subtraction of Fractions", with respect to the learning unit "Subtraction of Fractions" (i.e., a downward direction), as a supplementary learning direction.

Referring further to FIG. 6, the supplementary learning management unit 230 according to one embodiment of the invention may refer to the knowledge map shown in FIG. 6 and determine a learning unit corresponding to a node connected by a link assigned a high correlation, among other nodes 613 to 618 downwardly connected to a node 611 corresponding to the learning unit "Subtraction of Fractions", as a supplementary learning unit (i.e., the supplementary learning unit is determined with reference to a first weight). Further, the supplementary learning management unit 230 according to one embodiment of the invention may determine a learning unit corresponding to a node that is frequently included in a supplementary learning pattern experienced by another learner whose learning characteristics are similar to those of the learner or that has a low academic achievement of the another learner whose learning characteristics are similar to those of the learner, among the other nodes 613 to 618 downwardly connected to the node 611 corresponding to the learning unit "Subtraction of Fractions", as a supplementary learning unit (i.e., the supplementary learning unit is determined with reference to a second weight). Furthermore, the supplementary learning management unit 230 according to one embodiment of the invention may refer to both the first and second weights and determine a learning unit whose combined value of the first and second weights is great, as a supplementary learning unit.

For example, a learning unit called "Multiplication", which corresponds to a node 616 connected to the node 611 corresponding to the learning unit "Subtraction of Fractions" by a link assigned the highest correlation of "100", may be determined as a supplementary learning unit, or a learning unit called "Fractions", which corresponds to a node 613 connected to the node 611 corresponding to the learning unit "Subtraction of Fractions" by a link assigned the second highest correlation of "80" and for which another learner with similar learning characteristics has shown a low academic achievement, may be determined as a supplementary learning unit. As another example, all of multiple learning units each corresponding to five nodes 612, 613, 614, 616 and 618 downwardly connected to the node 611 corresponding to the learning unit "Subtraction of Fractions" may be determined as supplementary learning units, and a relative ratio or order in which learning information on the supplementary learning units is provided may be determined according to the first and second weights of each supplementary learning unit.

Figure 7:
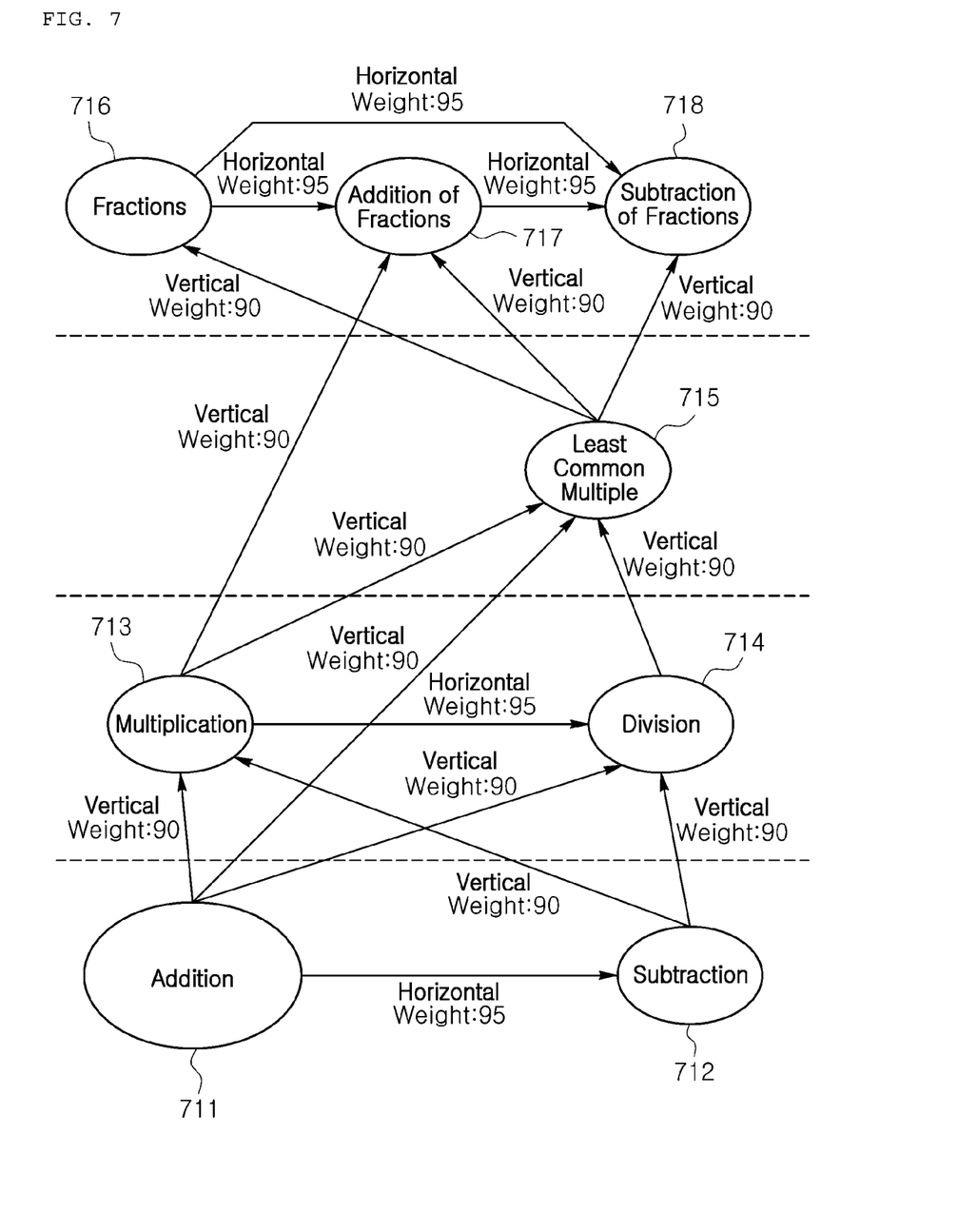
FIG. 7 illustratively shows the configuration of a knowledge map referred to for upward supplementary learning according to one embodiment of the invention.

FIG. 7 illustratively shows the configuration of a knowledge map referred to for upward supplementary learning according to one embodiment of the invention.

Referring to FIG. 7, it may be assumed that an academic achievement of a learner for a learning unit called "Addition" is not less than a predefined level. In this case, the supplementary learning management unit 230 according to one embodiment of the invention may determine a direction toward a learning unit whose level is not lower than that of the learning unit "Addition", with respect to the learning unit "Addition" (i.e., an upward direction), as a supplementary learning direction. The process of determining a supplementary learning unit in the embodiment of FIG. 7 is performed according to the same principle as that of determining a supplementary learning unit in the embodiment of FIG. 6, and thus a detailed description thereof will be omitted.

Figure 8:
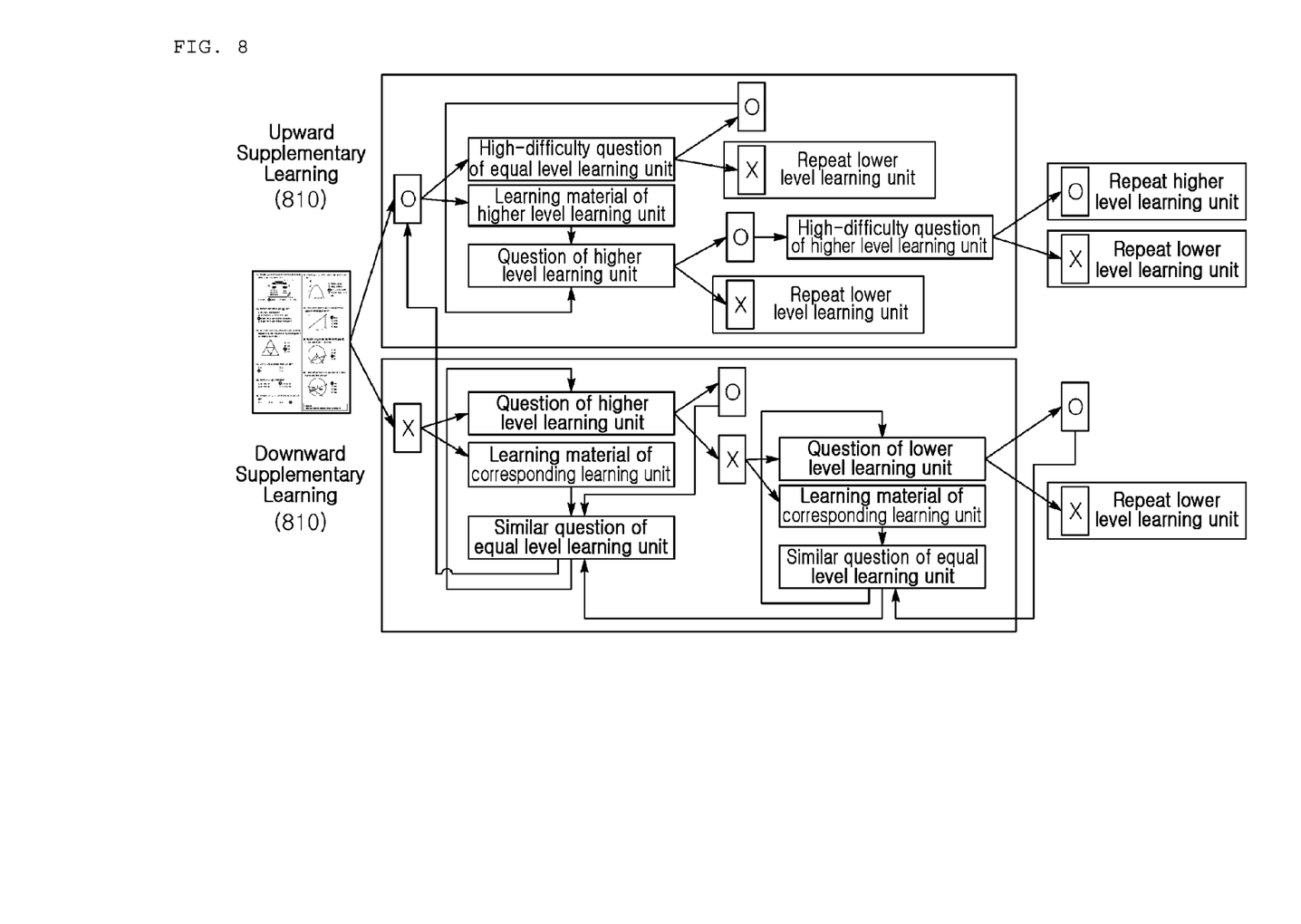
FIG. 8 illustratively shows how to progress downward or upward supplementary learning according to one embodiment of the invention.

FIG. 8 illustratively shows how to progress downward or upward supplementary learning according to one embodiment of the invention.

Referring to FIG. 8, the supplementary learning management unit 230 according to one embodiment of the invention may allow additional supplementary learning to be performed not only for a target learning unit which is determined to be subject to supplementary learning in view of a result of diagnostic learning performed by a learner, but also for a supplementary learning unit which is determined to be subject to supplementary learning while the learner performs supplementary learning for the target learning unit. Thus, the learner may eventually increase academic achievements for all necessary learning units.

Figure 9:
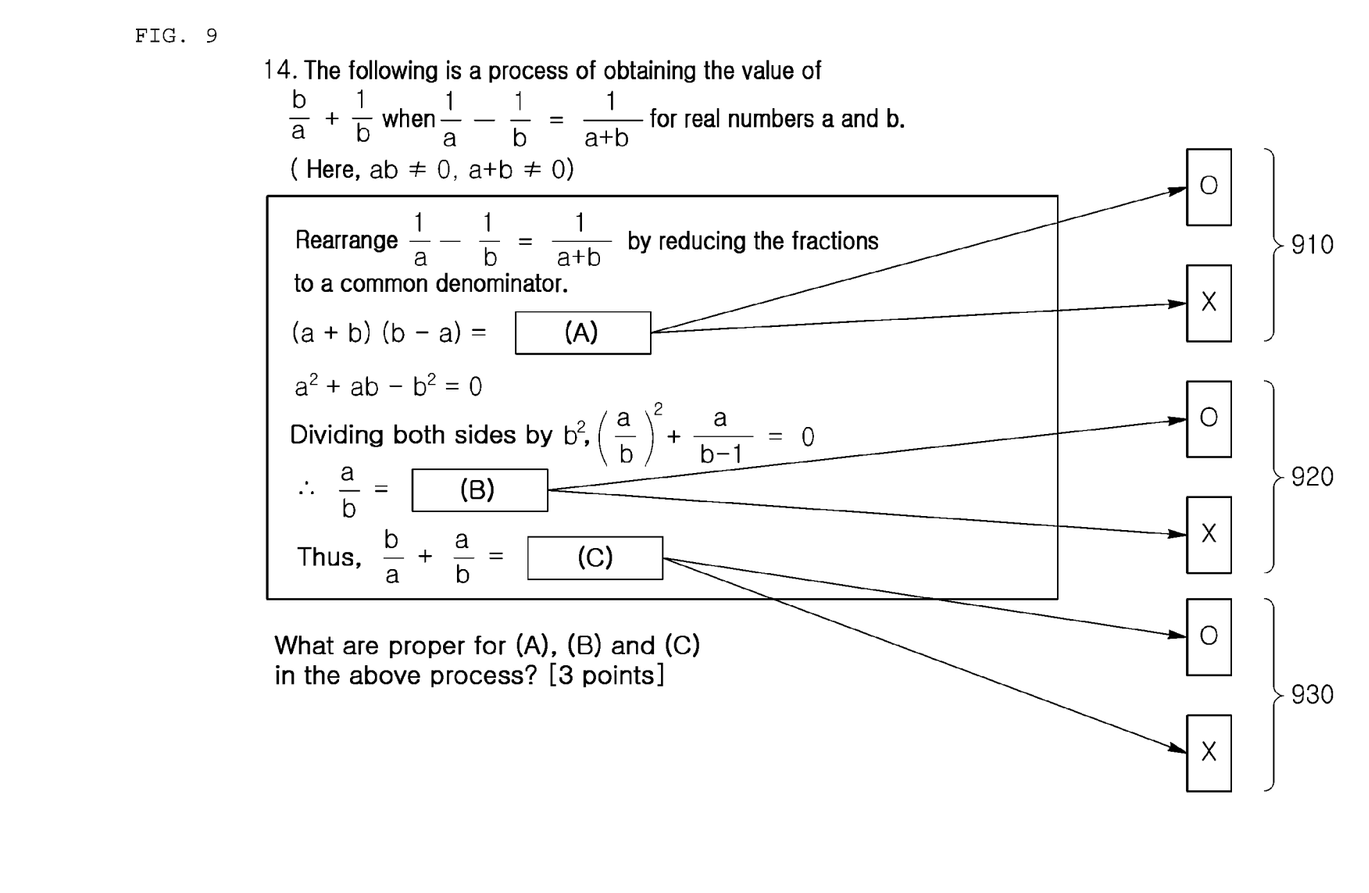
FIGS. 9 and 10 illustratively show the configurations for evaluating academic achievements for learning units according to one embodiment of the invention.
Figure 10:
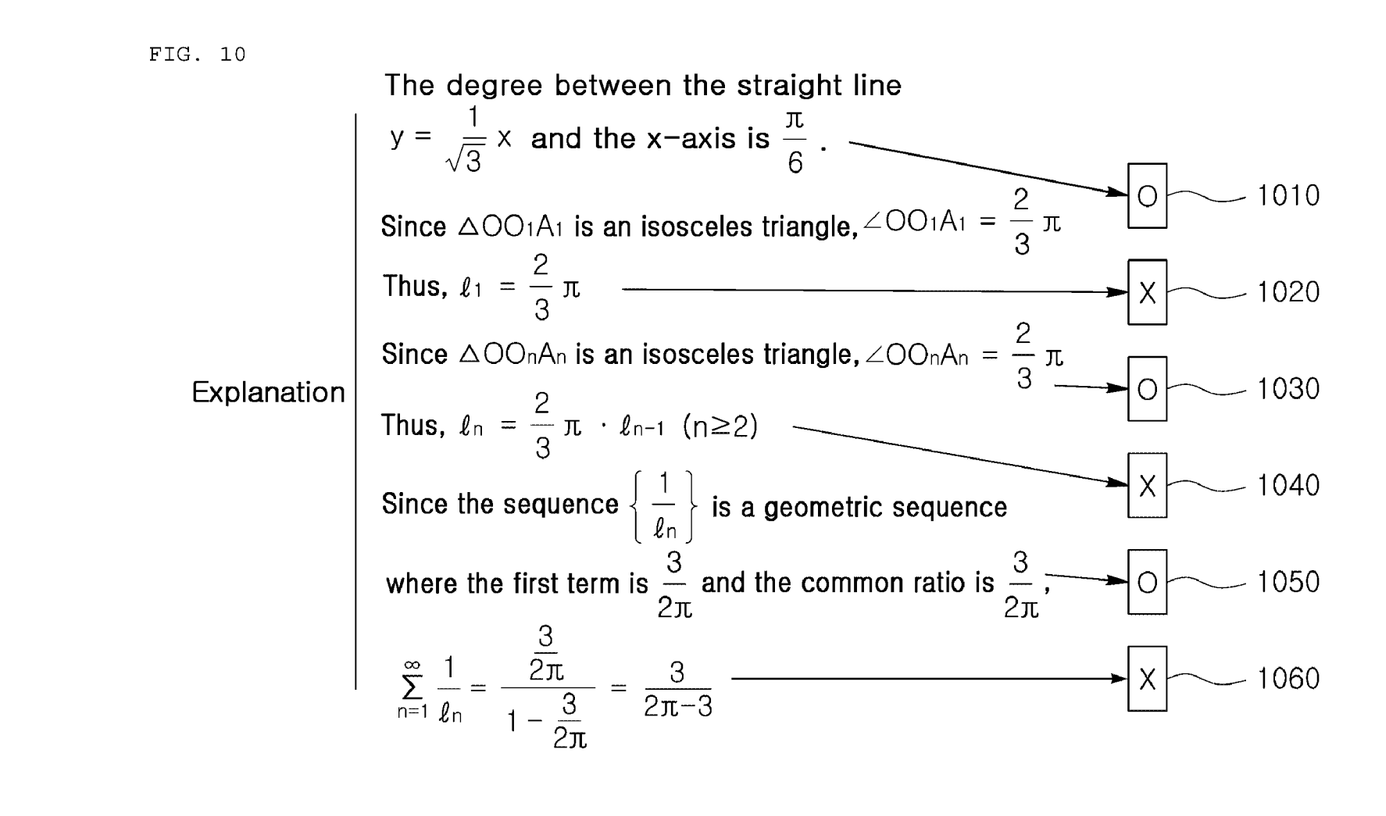

FIGS. 9 and 10 illustratively show the configurations for evaluating academic achievements for learning units according to one embodiment of the invention.

Referring to FIG. 9, while a learner solves one question, the learner's academic achievements for three learning units 910 to 930 may be evaluated. Referring to FIG. 10, while a learner is sequentially provided with an explanation or hint on a question, the learner's academic achievements for six learning units 1010 to 1060 may be evaluated.

Although the embodiments in which learning units for mathematics are provided have been mainly described above, it is noted that the present invention is not necessarily limited to the above embodiments, and any objects of learning regardless of subjects or fields may be considered as the learning units according to the invention.

Although the embodiments in which learning units in a knowledge map are classified by grades or levels according to a curriculum (i.e., vertically) have been mainly described above, it is noted that the present invention is not necessarily limited to the above embodiments, and the learning units may also be classified by themes or fields (i.e., horizontally) regardless of grades or levels according to the curriculum.

Meanwhile, the communication unit 240 according to one embodiment of the invention may function to enable the learning information provision system 200 to communicate with an external device such as the user terminal device 300.

Lastly, the control unit 250 according to one embodiment of the invention may function to control data flow among the knowledge map management unit 210, the learner management unit 220, the supplementary learning management unit 230, and the communication unit 240. That is, the control unit 250 may control inbound data flow or data flow among the respective components of the learning information provision system 200, such that the knowledge map management unit 210, the learner management unit 220, the supplementary learning management unit 230, and the communication unit 240 may carry out their particular functions, respectively.

The embodiments according to the invention as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present invention, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing learning information, comprising the steps of:
    determining a direction of supplementary learning necessary for a learner, based on the learner's academic achievement for a target learning unit;
    determining at least one supplementary learning unit to be provided to the learner, with reference to a first weight determined based on a correlation between the target learning unit and each of at least one other learning unit connected to the target learning unit along the determined direction, and a second weight determined based on nodes and links included in a supplementary learning pattern experienced by another learner, wherein learning characteristics of the another learner and those of the learner are similar at or above a predefined level; and
    providing the learner with learning information on the at least one determined supplementary learning unit,
    wherein the first weight is acquired from a knowledge map including two or more nodes each corresponding to two or more learning units and at least one link which connects the two or more nodes and is assigned a correlation between the two or more learning units.

2. The method of claim 1, wherein the two or more nodes and the at least one link are defined based on a learning system predetermined for the two or more learning units.

3. The method of claim 1, wherein the correlation between the two or more learning units is dynamically determined based on nodes and links that at least one learner has traversed while performing supplementary learning for the two or more learning units, or academic achievements of the at least one learner for the two or more learning units.

4. The method of claim 3, wherein a greater correlation is assigned to a link that the at least one learner has traversed more frequently.

5. The method of claim 3, wherein a greater correlation is assigned to a link connected toward a node having a lower academic achievement of the at least one learner.

6. The method of claim 3, wherein when a correlation between two learning units each corresponding to two nodes connected by a link is less than a predefined level, the link connecting the two nodes each corresponding to the two learning units is removed.

7. The method of claim 3, when two learning units each corresponding to two nodes not connected by a link share a specific learning unit having a correlation not less than a predefined level, a new link connecting the two nodes each corresponding to the two learning units is created.

8. The method of claim 1, wherein the second weight is determined to be greater for a learning unit corresponding to a node that is more frequently included in the supplementary learning pattern experienced by the another learner whose learning characteristics are similar to those of the learner at or above a predefined level.

9. The method of claim 8, wherein the second weight is determined to be greater for a learning unit corresponding to a node having a lower academic achievement of the another learner whose learning characteristics are similar to those of the learner at or above a predefined level.

10. The method of claim 1, wherein the learning characteristics include at least one of a grade, an academic achievement, a learning range, and a learning speed.

11. The method of claim 1, wherein in the step of determining the direction of supplementary learning necessary for the learner, when the learner's academic achievement for the target learning unit is less than a predefined level, a direction toward a learning unit whose level is lower than that of the target learning unit, with respect to the target learning unit, is determined as the direction of supplementary learning necessary for the learner, and when the learner's academic achievement for the target learning unit is not less than the predefined level, a direction toward a learning unit whose level is not lower than that of the target learning unit, with respect to the target learning unit, is determined as the direction of supplementary learning necessary for the learner.

12. The method of claim 1, wherein in the step of determining the at least one supplementary learning unit, at least a part of the at least one other learning unit is determined as the at least one supplementary learning unit, wherein a combined value of the first and second weights of the at least a part of the at least one other learning unit is not less than a predefined level.

13. The method of claim 1, wherein in the step of determining the at least one supplementary learning unit, a learning information provision ratio or a learning information provision order of the at least one supplementary learning unit is determined based on a combined value of the first and second weights.

14. A non-transitory computer-readable recording medium having stored thereon a computer program for executing the method of claim 1.

15. A system for providing learning information, comprising:
    a knowledge map management unit configured to manage a knowledge map including two or more nodes each corresponding to two or more learning units and at least one link which connects the two or more nodes and is assigned a correlation between the two or more learning units;
    a learner management unit configured to manage information on a supplementary learning pattern experienced by at least one learner; and
    a supplementary learning management unit configured to determine a direction of supplementary learning necessary for a learner, based on the learner's academic achievement for a target learning unit, to determine at least one supplementary learning unit to be provided to the learner, with reference to a first weight determined based on a correlation between the target learning unit and each of at least one other learning unit connected to the target learning unit along the determined direction, and a second weight determined based on nodes and links included in a supplementary learning pattern experienced by another learner, wherein learning characteristics of the another learner and those of the learner are similar at or above a predefined level, and to provide the learner with learning information on the at least one determined supplementary learning unit, wherein the first weight is acquired from the knowledge map management unit and the second weight is acquired from the learner management unit.

16. The system of claim 15, wherein the correlation between the two or more learning units is dynamically determined based on nodes and links that at least one learner has traversed while performing supplementary learning for the two or more learning units, or academic achievements of the at least one learner for the two or more learning units.

* * * * *